United States Patent Office 3,407,950
Patented Oct. 29, 1968

1

3,407,950
MEANS FOR ATTACHING A LIFT TRUCK TO A LORRY
Joseph Leslie Ward and John David Dixon, Basingstoke, England, assignors to Lansing Bagnall Limited, Basingstoke, England, a British company
Filed Mar. 7, 1966, Ser. No. 532,171
Claims priority, application Great Britain, Mar. 9, 1965, 10,006/65
4 Claims. (Cl. 214—512)

ABSTRACT OF THE DISCLOSURE

Means for self-loading an industrial lift truck on a lorry for transportation of the truck by the lorry, comprise a platform suspended from the lorry for carrying the truck during its transportation, which platform is movable between ground level and an elevated position, and means on the platform for co-operating with the load-lifting carriage of the truck so that when the truck is loaded onto the platform at ground level, operation of the lift means to raise the carriage will also raise the platform, and hence the remainder of the truck, into the elevated position.

---

This invention relates to means for attaching a lift truck to a lorry in a position in which the truck is suspended from or supported by the lorry above ground level whereby the truck may be transported by the lorry.

According to the invention means for attaching a lift truck to a lorry for transportation of the truck by the lorry which means comprise a platform for supporting the truck, during the transportation thereof, in a position above ground level, which platform is suspended from a part of the lorry and which platform is capable of movement from a first position in which the platform rests on the ground, so that the truck may be loaded thereon or unloaded therefrom, to a second position in which the platform is raised above ground level, and operating means for moving the platform and the truck loaded thereon between the aforesaid positions of the platform, which operating means are arranged for operation by the means provided for effecting vertical movement of the lifting carriage of the truck.

It is preferred that the platform is suspended from the rear end of the deck of the lorry.

It is also preferred that the operating means are provided with at least one non-extensible link having one end attached to the lorry and the other end attached to the carriage or a member movable thereby, the said link passing under a part of the platform, which part is located below each end of the link. In this case, two said links are preferably provided, each link comprising a chain. Also the pare of the platform under which the or each link passes is preferably a pulley mounted on the platform.

In one form of the invention the said other end of the or each non-extensible link is attached to a cross-bar movable by the carriage of the truck and in which the said cross-bar, in its lowermost position, is held above the lowermost position of the carriage, the arrangement being such that the platform may be raised by driving the truck on to the platform and by raising the carriage, which carriage will engage with the underside of the aforesaid cross-bar. Guide means may also be provided for controlling the movement of the aforesaid cross-bar to which the said other end of the or each link is attached.

The platform is preferably designed for vertical movement between its aforesaid first and second positions and in which one or more guides are provided for guiding the up and down movement of the platform. In this case, each said guide may comprise a pair of telescopic tubes,

2 one tube upstanding from the platform and the other tube depending from the deck of the lorry.

The invention also includes a lorry having attachment means as described above in combination with a lift truck supported by the platform of the attachment means, which truck is provided with means for effecting vertical movement of the lifting carriage of the truck and hence of the platform and the truck loaded thereon.

The means for effecting vertical movement of the lifting carriage of the truck is preferably hydraulically operated.

By way of example, a specific embodiment of attachment means and of a lorry fitted therewith in accordance with the invention will now be described with reference to the accompanying drawings in which.

With reference to the drawings, a lorry 10 is provided with a platform or tailboard 11 suspended from the underside of the rear end of the deck 12 of the lorry whereby an hydraulically-operated lift truck 13 may be loaded on to the tailboard 11 for transport of the truck by the lorry and subsequently unloaded therefrom.

Figure 1:
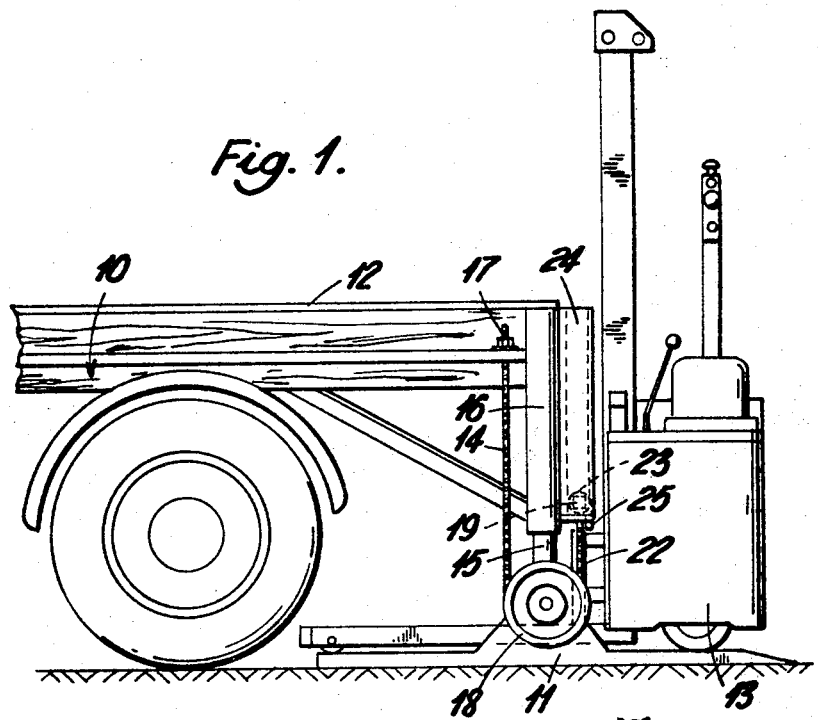
FIGURE 1 is an elevation of a lorry and of the attachment means fitted thereto, the figure showing the platform at ground level.
Figure 2:
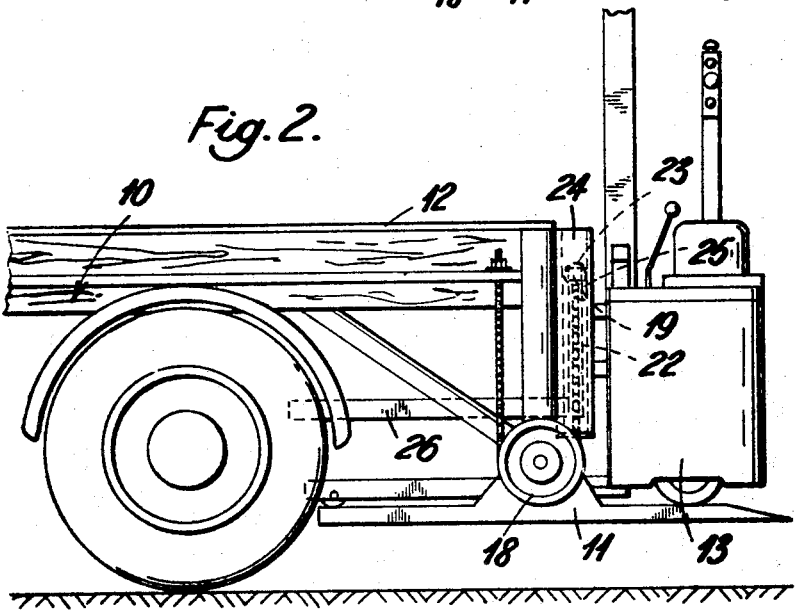
FIGURE 2 is an elevation of the lorry and of the attachment means shown in FIGURE 1 showing the platform in its raised position.
Figure 3:
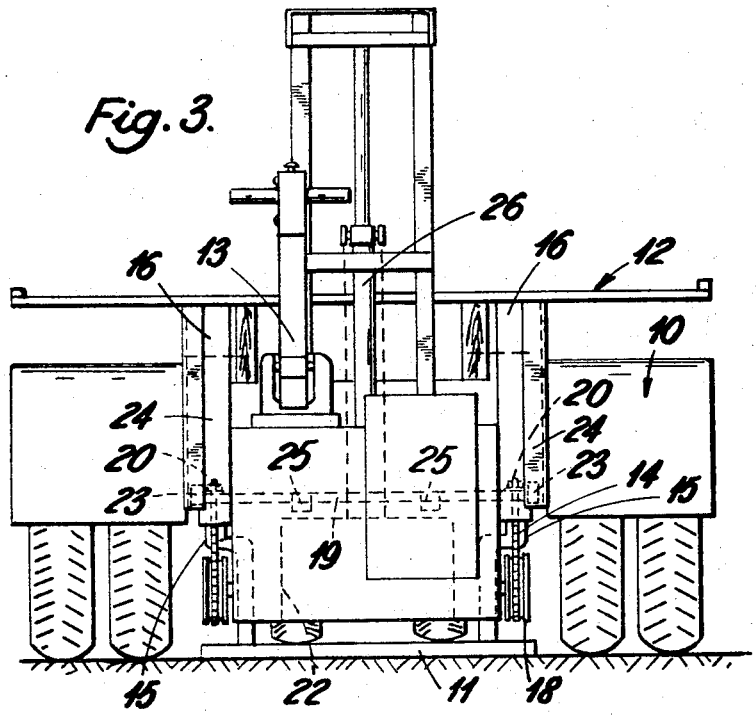
FIGURE 3 is a rear view of the lorry and of the attachment means shown in FIGURE 1.

The tailboard 11 is designed so that it may occupy a first position resting on the ground (see FIGURE 1) for loading of the truck thereon and for unloading the truck therefrom, and may be moved vertically into a raised or second position (see FIGURE 2) for transport of the truck. Guides are provided for guiding the platform in its vertical movement between these two positions, which guides comprise a pair of tubes 15 extending upwardly from the tailboard for telescopic engagement within a pair of tubes 16 extending downwardly from the deck of the lorry.

Figure 4:
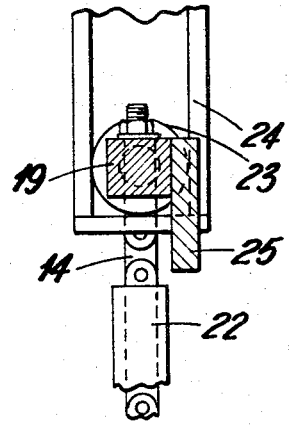
FIGURE 4 is an enlarged fragmentary section showing the relationship of the carriage and the cross-bar when the carriage is in its lowermost position.

Vertical movement of the tailboard is effected by means of an hydraulic jack 26 provided on the truck 13 for movement of the lifting carriage 22 of the truck and a pair of chains 14, one chain being located at each side of the truck. Each chain is fixed at one end 17 to the underside of the deck of the lorry, passes under one of two pulleys 18 mounted on the tailboard 11 and is fixed at its other end 20 to a common cross-bar 19 which bar is provided with a pair of rollers 23 one at either end for engaging in vertical guide means 24. These guide means are closed at their lower end, are connected to the downwardly extending tubes 16 and act as guides for up and down movement of the bar. The lowermost position of the bar 19 is designed to be slightly above the top surface of the carriage 22 (see especially FIGURE 4) whereby the bar 19 will lie above the carriage 22 when the truck is loaded onto the tailboard 11 with the carriage of the truck in its lowermost position. Upward movement of the carriage 22 will thus first effect engagement of the carriage with the underside of the bar 19 and then subsequently upward movement of the bar together with, by means of the chains 14, the tailboard 11 and the truck loaded thereon. As shown, the rear surface of the cross-bar 19 is provided with a pair of downwardly extending hooks 25 which engage the carriage 22 and thereby locate the carriage beneath the bar to assist it preventing the truck moving rearwardly when carried on the platform.

Return movement of the tailboard 11 to ground level is effected by lowering of the carriage and hence allowing the weight of the truck to effect downward movement of the bar 19 and also of the tailboard 11.

Means (not shown) are provided for retaining the truck on the tailboard. Such means may be chocks or may be apertures in the tailboard for engagement with the wheels of the truck. Normally, the truck would also be retained on the tailboard by e.g. chains, during transit.

Also, if desired, the forks 26 of the lifting carriage 22 may be foldable from their horizontal opearting position, as shown, into an upwardly extending inoperative position.

Furthermore, means may be provided for raising the tailboard 11 when the truck has been unloaded therefrom to allow for use of the lorry independently of the truck. Such means may comprise a light spring within the tubes 16 or alternatively a winch at the end 17 of the chain 14 which is fixed to the lorry. In such cases, downward movement of the tailboard to allow a truck to be loaded thereon would be effected by, in the former case, the weight of a man standing on the platform, and in the latter case reverse action of the winch.

We claim:

1. Apparatus for self-loading onto a lorry for transportation thereby an industrial lift truck having a load-lifting carriage and means for raising and lowering the carriage, said self-loading apparatus comprising a platform for carrying the truck during transportation thereof, means for connecting the platform to the lorry for up and down movement of the platform between ground level and an elevated position, the said connecting means comprising two pairs of telescoping tubes, one at each end of the platform, one tube of each pair upstanding from the platform and the other tube of each pair depending from the lorry, and means engageable by the load-lifting carriage of the truck on the platform for raising the platform when the load-lifting carriage of said truck is raised, whereby the platform and the truck thereon are raised into the said elevated position.

2. Apparatus for self-loading onto a lorry for transportation thereby an industrial lift truck having a load-lifting carriage and means for raising and lowering the carriage, said self-loading apparatus comprising a platform for carrying the truck during transportation thereof, means for connecting the platform to the lorry for up and down movement of the platform between ground level and an elevated position, a horizontal cross-bar adapted and arranged for engagement by the load-lifting carriage of the truck on the platform and a pair of chains, one at each end of the platform, each chain being attached at one of its ends to the lorry and passed downwardly and underneath a pulley fixed to the platform, and then upwardly and attached to said horizontal cross-bar, the cross-bar and the chains combining to provide means for raising the platform when the load-lifting carriage of the truck is raised, whereby the platform and the truck are raised into the said elevated position.

3. Self-loading means as claimed in claim 2 in which guide means are provided for guiding the up and down movement of the cross-bar and in which stops are provided for maintaining the cross-bar above the lowermost position of the load-lifting carriage of the truck.

4. Apparatus for self-loading onto a lorry for transportation thereby an industrial lift truck having a load-lifting carriage and means for raising and lowering the carriage, said self-loading apparatus comprising a platform for carrying the truck during transportation thereof, means for connecting the platform to the lorry for vertical up and down movement of the platform between ground level and an elevated position, the said platform being held in its elevated position without ground supporting means, and means engageable by the load-lifting carriage of the truck on the platform for raising the platform when the load-lifting carriage of said truck is raised, whereby the platform and the truck thereon are raised into the said elevated position.

References Cited

UNITED STATES PATENTS

| | | | |
|---|---|---|---|
| 2,676,720 | 4/1954 | Noble | 214—515 |
| 2,904,201 | 9/1959 | Rhodes | 214—515 |
| 3,180,503 | 4/1965 | Shaw | 214—75 |
| 3,302,810 | 2/1967 | Heidrick | 214—730 |
| 3,065,871 | 11/1962 | Schramm | 214—506 |

ROBERT G. SHERIDAN, *Primary Examiner.*